(12) United States Patent
Hoyle

(10) Patent No.: US 9,321,378 B2
(45) Date of Patent: Apr. 26, 2016

(54) VEHICLE SEAT

(75) Inventor: James Brooks Hoyle, Telford (GB)

(73) Assignee: BAE SYSTEMS Plc, London (GB)

( * ) Notice: Subject to any disclaimer, the term of this patent is extended or adjusted under 35 U.S.C. 154(b) by 95 days.

(21) Appl. No.: 13/879,684

(22) PCT Filed: Oct. 13, 2011

(86) PCT No.: PCT/EP2011/067863
§ 371 (c)(1),
(2), (4) Date: Apr. 16, 2013

(87) PCT Pub. No.: WO2012/052344
PCT Pub. Date: Apr. 26, 2012

(65) Prior Publication Data
US 2013/0200676 A1  Aug. 8, 2013

(30) Foreign Application Priority Data

Oct. 19, 2010 (EP) .................................. 10251815
Oct. 19, 2010 (GB) .................................. 1017679.0

(51) Int. Cl.
*B60N 2/30* (2006.01)
*B60N 2/015* (2006.01)
(Continued)

(52) U.S. Cl.
CPC .............. *B60N 2/3097* (2013.01); *B60N 2/015* (2013.01); *B60N 2/24* (2013.01); *B60N 2/3065* (2013.01); *B60N 2/4242* (2013.01); *B60N 2/503* (2013.01);
(Continued)

(58) Field of Classification Search
CPC ........ B60N 2/3097; B60N 2/015; B60N 2/24; B60N 2/4242; B60N 2/503; B60N 2/505; B60N 2/544

USPC .............................. 297/334, 340, 14, 216.17
See application file for complete search history.

(56) References Cited

U.S. PATENT DOCUMENTS 3,268,200 A * 8/1966 Eicher .................... B60N 2/045
297/296 X
3,442,552 A * 5/1969 Lehner ........................ 297/334
(Continued)

FOREIGN PATENT DOCUMENTS

CN     201432596 Y     3/2010
DE     19701387 A1     7/1998
(Continued)

OTHER PUBLICATIONS

Notification Concerning Transmittal of International Preliminary Report on Patentability (Forms PCT/IB/326 and PCT/IB/373) and the Written Opinion of the International Searching Authority (Form PCT/ISA/237) dated May 2, 2013, issued in corresponding International Application No. PCT/EP2011/067863. (7 pages).
(Continued)

*Primary Examiner* — Anthony D Barfield
(74) *Attorney, Agent, or Firm* — Finch & Maloney PLLC

(57) ABSTRACT

A seat for a vehicle is disclosed which includes a seat chassis for supporting a back member and a base member. The base member can have a first condition, which extends generally perpendicularly from the back member and is suitable for accommodating the occupant in a sitting position. In a second condition, the base member is retracted and thereby tends to reduce the profile of the seat. In selectively configuring the base member from the first condition to the second condition, the base member tilts such that it rises at the back edge and dips at the front edge.

17 Claims, 17 Drawing Sheets

(51) Int. Cl.
  *B60N 2/24* (2006.01)
  *B60N 2/42* (2006.01)
  *B60N 2/50* (2006.01)
  *B60N 2/54* (2006.01)

(52) U.S. Cl.
  CPC ............... *B60N 2/505* (2013.01); *B60N 2/544* (2013.01); *B60N 2002/247* (2013.01)

(56) References Cited

U.S. PATENT DOCUMENTS

| | | | |
|---|---|---|---|
| 3,480,324 A * | 11/1969 | Bauer et al. | 297/334 |
| 4,523,730 A | 6/1985 | Martin | |
| 4,632,457 A | 12/1986 | Hofrichter et al. | |
| 5,273,240 A | 12/1993 | Sharon | |
| 2,758,859 A | 2/1998 | Gonzalez | |
| 6,270,161 B1 | 8/2001 | De Filippo | |
| 6,655,738 B2 * | 12/2003 | Kammerer | 297/336 X |
| 7,300,107 B2 * | 11/2007 | Kammerer | 297/334 X |
| 7,413,247 B2 | 8/2008 | Van Druff et al. | |
| 7,744,155 B2 | 6/2010 | List et al. | |
| 7,914,078 B2 * | 3/2011 | Hentges | 297/334 X |
| 8,226,170 B2 | 7/2012 | Lutzka et al. | |
| 8,801,103 B2 | 8/2014 | Bittinger et al. | |
| 2005/0116516 A1 | 6/2005 | Robinson | |
| 2007/0029854 A1 | 2/2007 | Robinson | |
| 2007/0035167 A1 | 2/2007 | Meyer | |
| 2007/0228795 A1 | 10/2007 | Boehme et al. | |
| 2010/0102609 A1 | 4/2010 | Confer et al. | |
| 2010/0230989 A1 | 9/2010 | Cantor et al. | |
| 2011/0037300 A1 | 2/2011 | Pettigrew et al. | |
| 2012/0001461 A1 | 1/2012 | Alexander et al. | |
| 2013/0207429 A1 | 8/2013 | Hoyle | |
| 2013/0270877 A1 | 10/2013 | Hoyle | |

FOREIGN PATENT DOCUMENTS

| | | |
|---|---|---|
| EP | 1361104 A1 | 11/2003 |
| EP | 1530930 A1 | 5/2005 |
| FR | 2898554 A1 | 9/2007 |
| FR | 2927026 A1 | 8/2009 |
| FR | 2929179 A1 | 10/2009 |
| GB | 2120931 A | 12/1983 |
| GB | 2449451 A | 11/2008 |
| JP | 2010006210 A | 1/2010 |
| WO | 2009070884 A1 | 6/2009 |

OTHER PUBLICATIONS

International Search Report (PCT/ISA/210) issued on Mar. 1, 2012, by the European Patent Office as the International Searching Authority for International Application No. PCT/EP2011/067863.
European Search Report issued Sep. 6, 2011 for European Application No. 10251815.6.
Great Britain Search Report issued Jan. 26, 2011 for Great Britain Application No. 1017679.0.
International Preliminary Report on Patentability issued in PCT Application No. PCT/EP2011/067861, dated Apr. 23, 2013, 6 pages.
International Search Report received in PCT Application No. PCT/EP2011/067861, dated Mar. 1, 2012, 2 pages.
European Search Report received in European Patent Application No. 10251825.5, dated Jun. 30, 2011, 5 pages.
United Kingdom Search Report received in Great Britain Patent Application No. 10176220, dated Jan. 20, 2011, 1 page.
International Report on Patentability and Written Opinion received in PCT Application No. PCT/EP2011/067863 dated Apr. 23, 2013, 7 pages
International Search Report received in PCT Application No. PCT/EP2011/067865, dated Dec. 19, 2011, 3 pages.
European Search Report received in European Patent Application No. 10251824, dated Mar. 3, 2011, 2 pages.
International Preliminary Report on Patentability and Written Opinion received in PCT Application No. PCT/EP2011/067865, dated Apr. 23, 2013, 6 pages.
United Kingdom Search Report received for Great Britain Application No. 1017636.0 dated Jan. 21, 2011, 1 page.
Australlan Search Report received in Australian Patent Application No. 2011319568. dated Apr. 29, 2015, 6 pages.

* cited by examiner

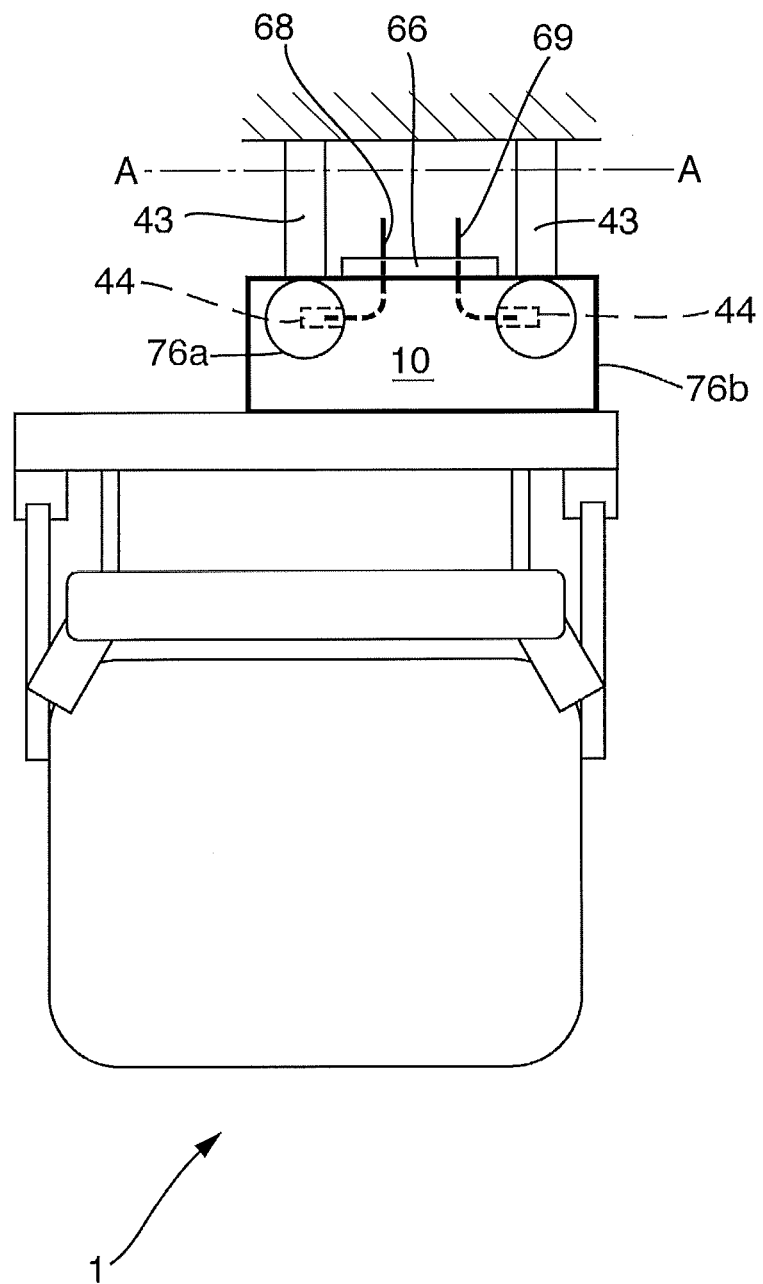

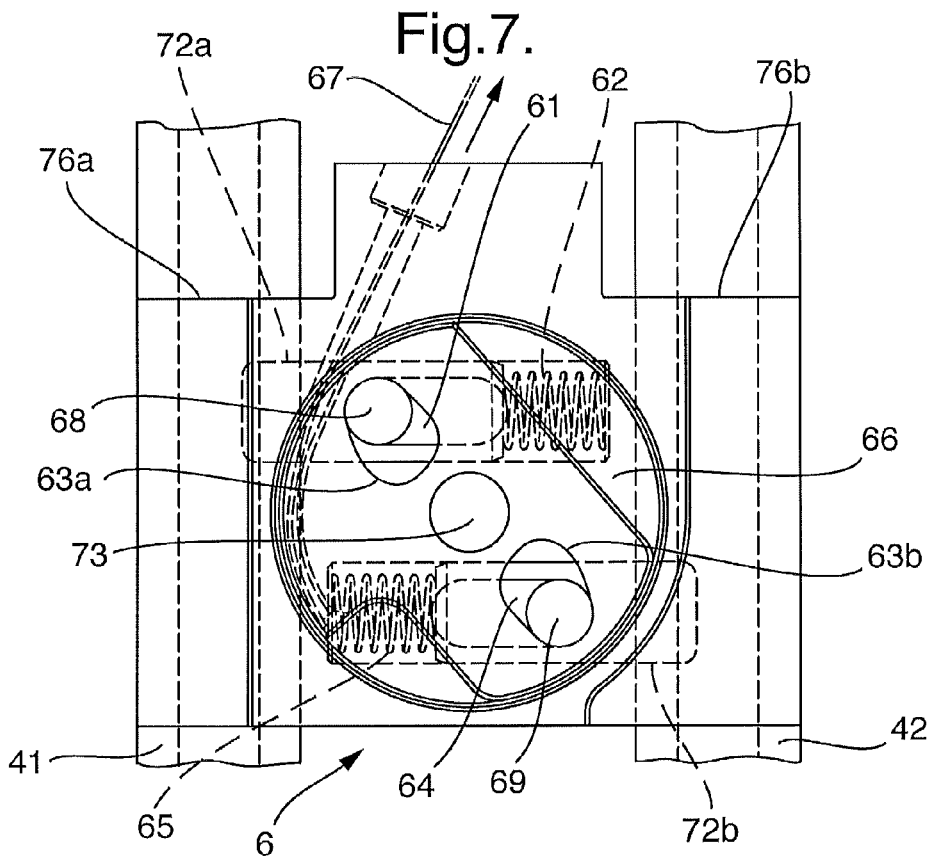
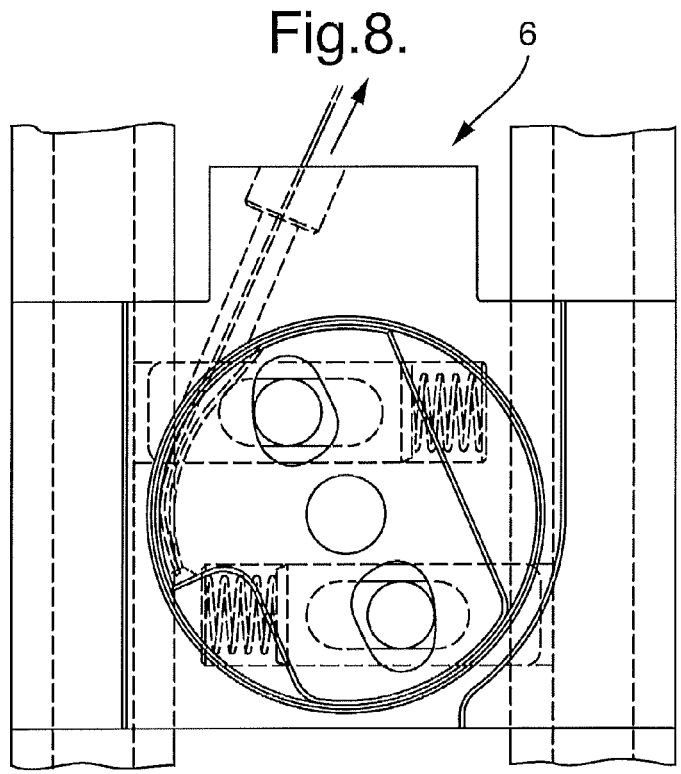

6

VEHICLE SEAT

The present invention relates to a seat for a vehicle and in particular, but not exclusively, a seat for a turret of a vehicle.

Various vehicles have limited interior space in which to accommodate human occupants. The cabins, or cabs, of such vehicles will normally offer enough space for an occupant to access the vehicle seat, sit in the vehicle seat, and access the necessary controls whilst seated. Space may not be provided for other any other task.

Accordingly, due to the limited space available in a vehicle, access to the seat is generally by a specific and predetermined manoeuvre.

For example where cabins are disposed in the turrets of vehicles, an occupant may access a seat disposed in the turret cabin by manoeuvring downwards through a hatch in the roof of the turret. The occupant may evacuate the seat by manoeuvring upwards through the hatch.

However, in certain circumstances, it may not always be desirable to access or evacuate a vehicle seat according to known manoeuvres.

According to the invention there is provided a seat for a vehicle, the seat comprising:

a seat chassis for supporting further seat components, said further seat components comprising a back member for supporting the back of the occupant; and a base member, comprising a front edge and a back edge, the base member being for configuration in a first condition where the base member extends generally perpendicularly from the back member and is suitable for accommodating the occupant in a sitting position, and being for configuration in a second condition where the base member is retracted and thereby tends to reduce the profile of the seat; and an attachment for connecting the base member to the chassis such that the base member may be selectively configured between the first condition and the second condition, wherein selectively configuring from the first condition to the second condition causes the base member to rise at the back edge and dip at the front edge of the base member.

A seat that can be reconfigured in such a way can tend to be much easier to reconfigure in a tight space where, for example, the occupant may not be able to stand up or move forward sufficiently to enable a seat to reconfigure by way of a seat that flips upwards (i.e. a seat where the back edge of the base member would tend to remain in a fixed position and where the front edge would rotate upwards)

Further, because the base member tends to swivel upwards, the space below the seat chassis and the back member is not occupied by the seat member. This can provide a space below the seat which may be used as an access route.

Such an access route can be particularly suited to seats for installation in the turrets of turreted vehicles. In such applications space is limited and furthermore certain configurations of the turret may trap the occupant within the turret if there is not space to crawl under the seat.

The attachment may comprise a first link extending from a first pivot joint on the chassis to a first pivot joint on the seat member, and a second link extending from a second pivot joint on the chassis to a second pivot joint on the seat member the links, the seat member and the chassis thereby providing a four bar linkage.

Such a linkage can tend to provide a robust and reliable attachment for effecting the switch from either base member condition to the other. The link at the base member and defined between the first pivot joint on the seat member and the second pivot joint on the seat member, may be the shortest link. The pivot joints at the chassis may, for the purposes of conceptualising the four bar linkage, be thought of as being fixed in position (though, in absolute terms these pivots are not in a fixed position because the chassis may be free to move).

Further, the links can be chosen so as to be suitable for bearing the load resulting from the seated occupant. For example, the links may be formed by bars of mild steel. Other attachment mechanisms may not be so readily provided with appropriate load bearing capabilities.

A duplicate first link and second link may be provided on an opposite side of the chassis to the first link and second link. This helps to spread the load and also reduces the lateral bending moments exerted on the attachment which may be expected to result where the attachment is not laterally symmetric.

The seat chassis may comprise at least one structural side member that extends frontwards. The side member may be a panel. The side panel may extend forwards of the back member to a distance that is in the range of 100 mm to 400 mm. Such a side member can provide a structure upon which further seat components may be mounted. The use of a panel as a side member may tend to distribute the stress about the chassis, though a suitably configured frame may permit an adequate distribution of stress whilst saving mass.

In particular, where two side members are provide and they extend sufficiently, for example in the order of 100 mm to 400 mm frontwards from the back member, the side members are well suited to provide support along the load path of the seat member because they will tend to reduce the bending moments which might otherwise be exerted on the seat.

The seat may further comprise a first latching bar and a second latching bar and the chassis may further comprise a first latch gate and a second latch gate. The latching bars and latch gates may be, operable such that as the base member is configured into first condition, the first latching bar engages with the first latching gate to secure the first latching bar and as the base member is configured into the second condition, the second latching bar engages with the second latching gate to secure the second latching bar. As such, the base member may be secured in either of the first or second conditions.

The second latching bar may be disposed towards the back edge of the base member. By thus tending to provide the latching bar at the extremity of the base element, the seat makes use of the mechanical advantage offered by the length of the base element from the pivots to the latch. Making use of the mechanical advantage tends to reduce the force exerted at the latch to retain the bar within the latching gate. Insofar as this force is reduced, the service life of the latch can be extended or allows the provision of a lighter latch.

The first latch gate and the second latch gate may each be provided with a release actuator which, when operated, may allow the release of any latching bar secured in that latch gate.

Whether the base member remains in either the first or second condition is therefore dependent on how the release actuator is applied. The release actuator may be such that it comprises a lever that is readily accessible by the occupant so as to be able to select whether the base member is to be held in one condition or be allowed to be reconfigured to the other condition.

The release actuator may be a lever connected to a cable, such as a Bowden cable, the cable being connected at its other end to its associated latch gate.

So that the invention may be more clearly understood, at least one embodiment of the invention shall now be described with reference to the following figures of which:

FIGS. 5 and 6 show the back aspect and top-down aspect respectively of the seat as configured in FIG. 3;

FIGS. 7, 8 and 9 show the action of a mechanism for securing the seat in a low or high position;

Figure 17:
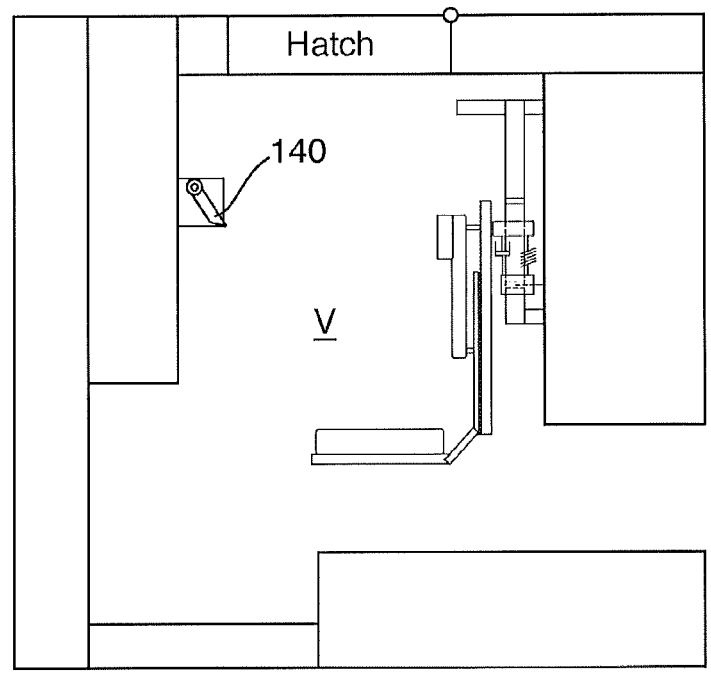
Figure 18:
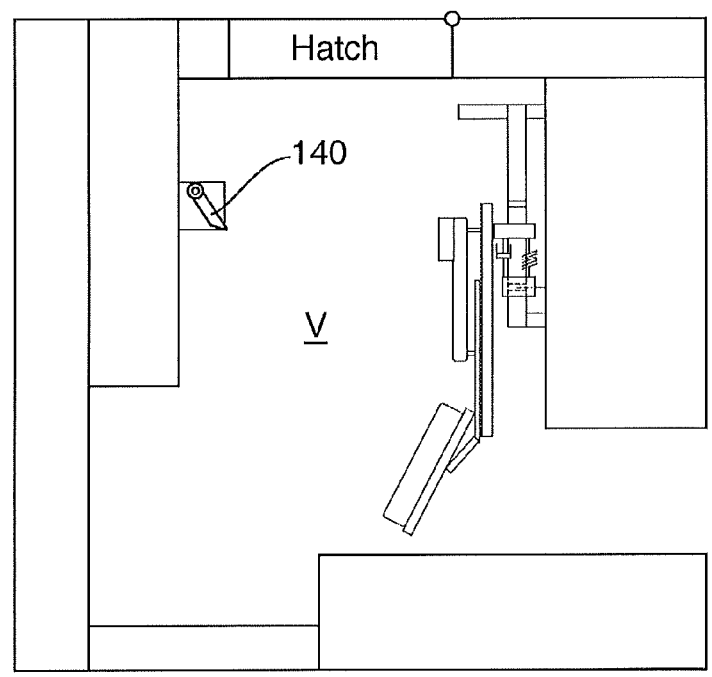
Figure 19:
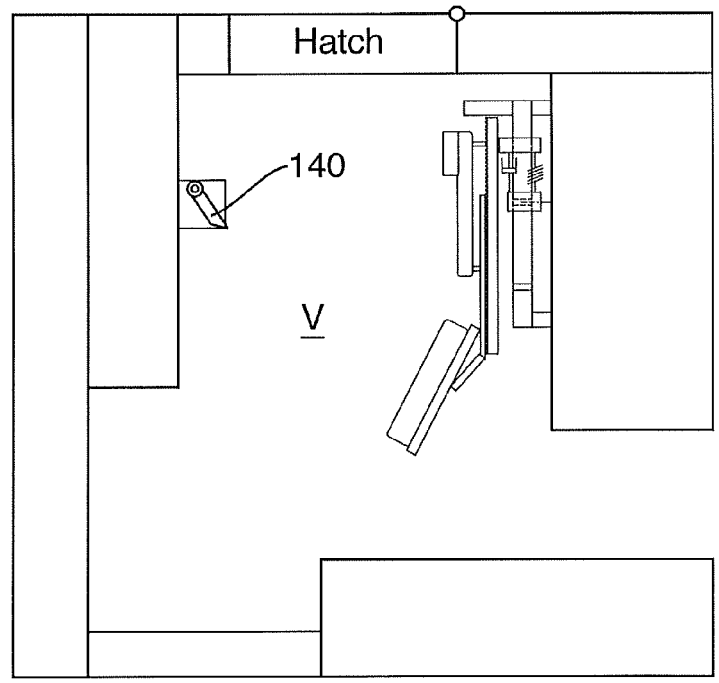
Figure 20:
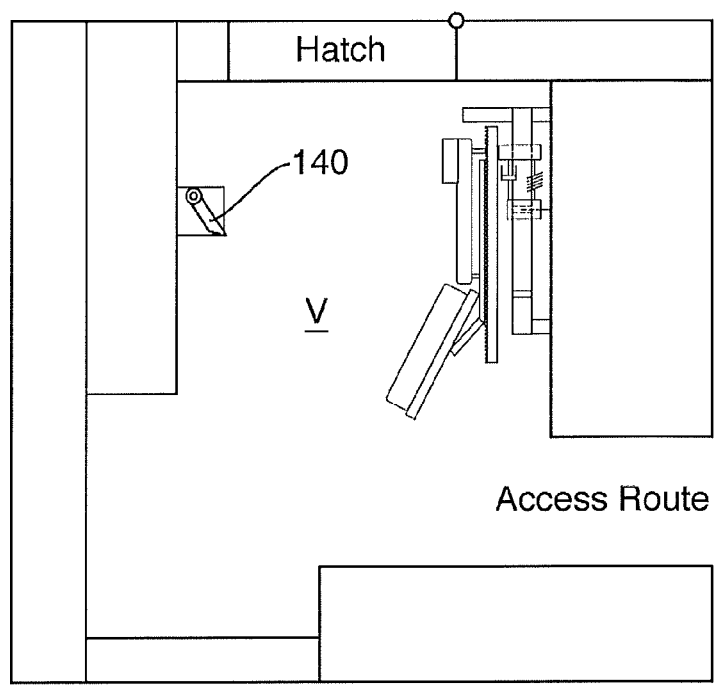
Figure 21:
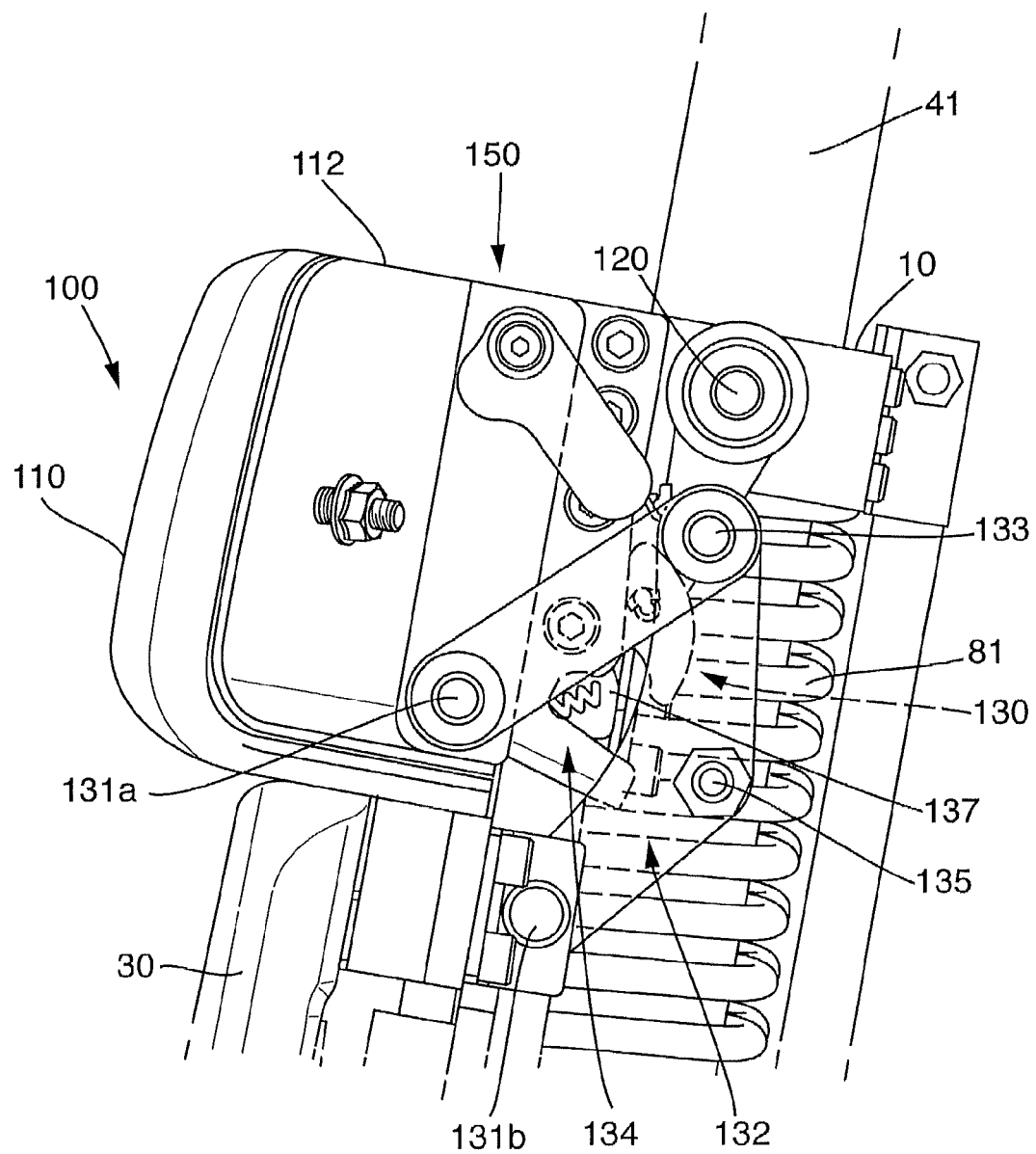
Figure 22:
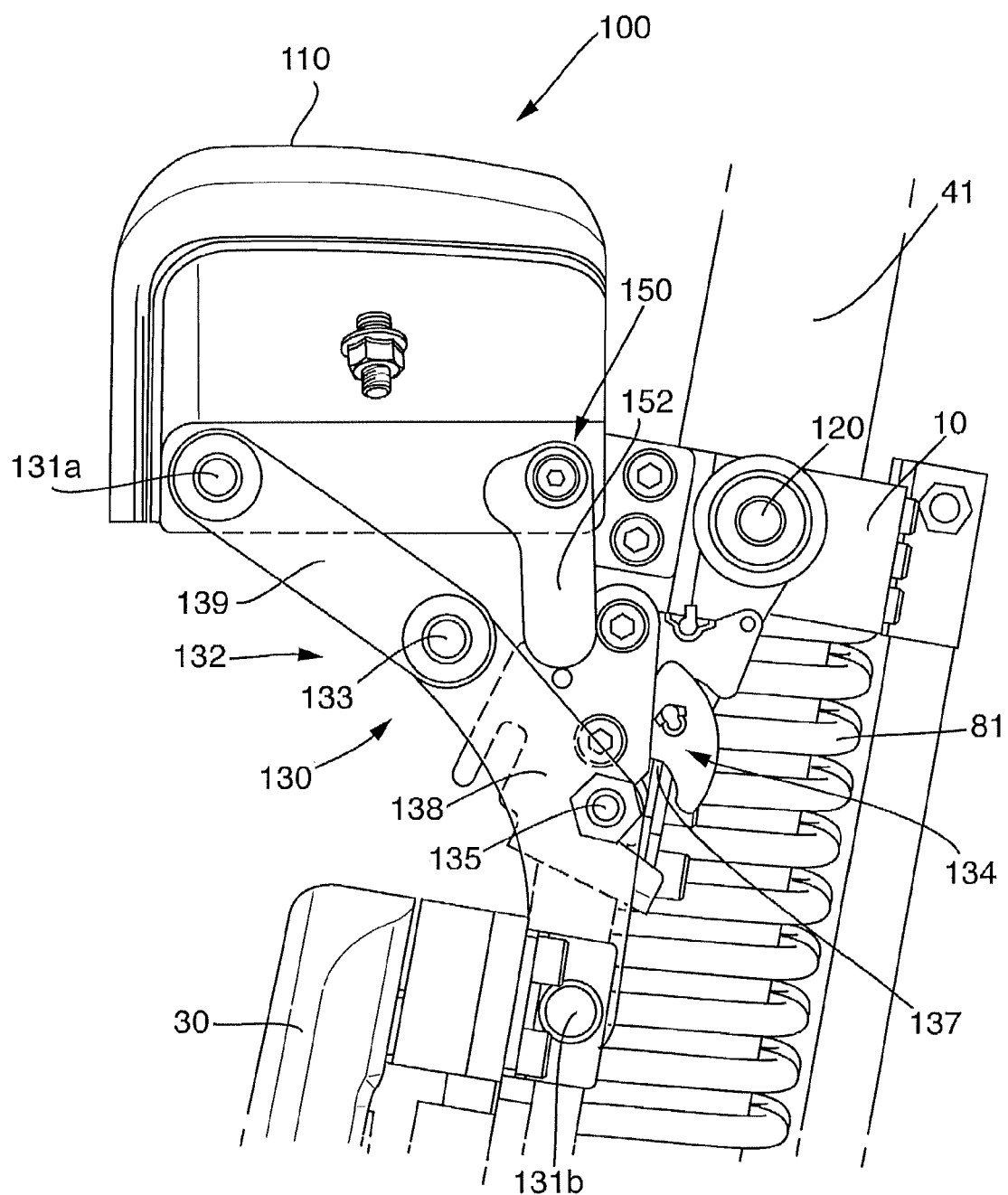

FIG. 17 through to 20 show schematically a seat disposed in a confined space and further show the series of actions by which a seat may be reconfigured to enable occupant evacuation; and FIGS. 21 and 22 show a side aspect of a perch for use in the seat, the perch being shown configured in a flush and protruding condition respectively.

Throughout the following description, the location of components of the seat may be referred to as forwards, backwards, upwards or downwards. These terms are to be understood in the context of a seat that is arranged for use within a vehicle and which is arranged to face forwards in the vehicle. As such these terms will have the well known and accepted meaning that they do in the context of vehicles.

Figure 1:
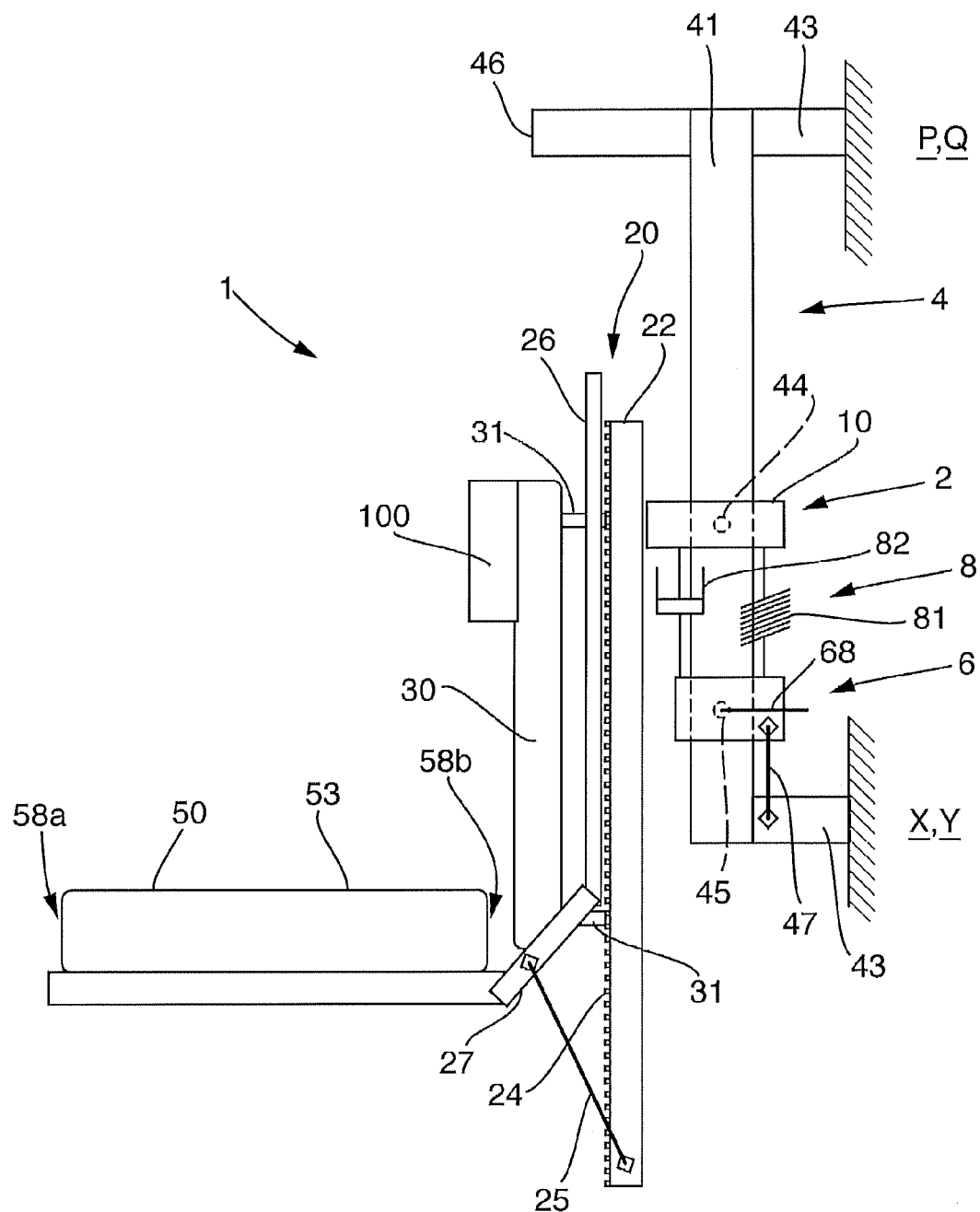
FIG. 1 shows a schematic representation of a seat for a vehicle as viewed from a side aspect, where the seat is configured for a shorter occupant to occupy a low position.
Figure 2:
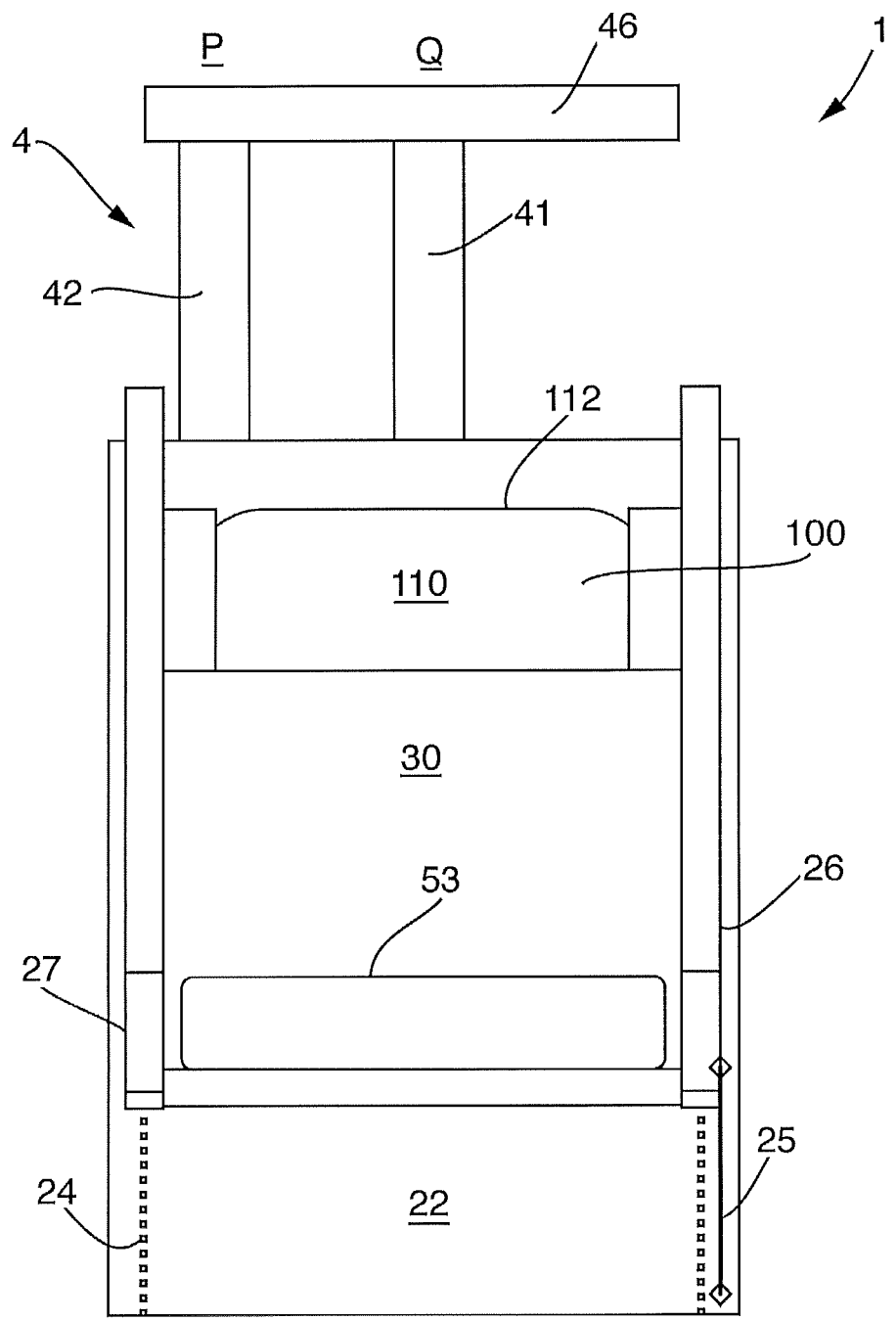
FIG. 2 shows a schematic representation of the seat of FIG. 1, when configured as in FIG. 1 and from a front aspect.

Nonetheless, it is further clarified what these terms mean with reference to FIG. 1 where the front of the seat is at the left hand side, the back is on the right, and the top of the seat is the part towards the top of the figure.

As may be seen from the figures, a seat 1 comprises a seat element 2, a support 4, a platform block 6 and a suspension system 8.

The support 4 comprises four anchors 43 which attach to a vehicle wall at four points P, Q, X and Y. The support 4 further comprises a first pole 41 which is fixed at a first end to the anchor 43 that is attached to the wall at point P and at the its other end to the anchor 43 that is attached to the wall at point X.

In addition the support 4 comprises a second pole 42, equivalent to the first pole 41 and extending between the anchors 43 at Q and Y.

The anchors 43 may be in the form of a bracket which is bolted or otherwise secured to the vehicle.

Vibration isolation bushes (not shown) are interposed between the poles 41, 42 and their respective anchors 43.

First pole 41 and second pole 42 are generally parallel to one another and are substantially perpendicular to the ground plane which a vehicle would be supported on.

A bottom recess 45, positioned towards the lower extremity of the pole 41, and having the form of a cylindrical bore, is provided in the first pole 41. An equivalent bottom recess 45 is provided in the second pole 42.

Further up the first pole 41 there is a top recess 44 having the same form and with an equivalent top recess 44 provided at the second pole 42.

For each of the first and second poles, the separation between the top recess and the bottom recess provided at that pole is approximately 0.2 m.

The platform block 6, or detent block, is arranged on the first and second poles 41, 42 such that it may slide along the length of the poles but is not free to move relative to the support in other ways. To this end the platform block 6 defines a first sleeve 76a for attachment to the first pole 41 and a second sleeve 76b for attachment to the second pole 42.

A first weight-opposing resilient member 47 connects the platform block 6 to a lower portion of the support 4. The first weight-opposing resilient member 47 is in the form of a pressurised hydraulic cylinder and that is biased to extend and thereby urge the platform block 6 to slide up the support 4. The first weight-opposing resilient member 47 is configured to exert a force that is slightly greater than the weight of the seat element 2.

As can be seen from FIGS. 5, 7, 8 and 9, positioned between the sleeves 76a and 76b of the platform block 6 and therefore between the poles 41 and 42, the platform block 6 is provided with a first pin 61 and a second pin 64 which are respectively biased by resilient pin-urging members 62 and 65 to protrude through apertures 72a and 72b at the sleeves 76a and 76b and onto the associated pole 41 or 42.

The pins 61 and 64 are dimensioned such that they may enter into the recesses 45, 44 provided in the poles 41, 42 when the platform block 6 is aligned with either the set of top recesses 44 or bottom recesses 45. The pins 61 and 64 enter the recesses and provide a sufficiently tight fit to transfer loads between pins 61, 64 and poles 41, 42 without permitting substantial wobble.

Each pin 61 and 64 is provided with a lug, 68 and 69 respectively, that extends perpendicularly from the pin axis (defined by the generally elongate form of the pin) and extends in a backwards direction. Each pin lug 68, 69 engages with an associated cam surface 63a, 63b in a common cam 66.

The first pin 61 is arranged above the second pin 64. Hence the first pin lug 68 and the associated cam surface 63a are arranged above the second pin lug 69 and the associated cam surface 63b. The cam 66 pivots about a joint 73 that is interposed midway between cam surface 63a and cam surface 63b.

The cam surface 63a has a form equivalent to the cam surface 63b. Both are surfaces defined by apertures within the cam 66. Conceptually, the cam surface 63a can be rotated 180° about the cam 66 pivot joint to substantially map onto the cam surface 63b.

A cable 67 is attached to a point on the cam 66 that is disposed towards a maximum distance on the cam 66 from the cam pivot joint 73.

As can be seen in the figures, the platform block 6 is connected to the seat element 2 by a suspension system 8. The suspension system 8 comprises a pair of helical springs 81, the first of which is arranged coaxially along and coiling around a portion of the first pole 41, the second of which is arranged coaxially along and coiling around a portion of the second pole 42. Each helical spring 81 connects the platform block 6 to the seat element 2. As an alternative to the helical spring 81, other forms of resilient member may be used such as hydraulic or pneumatic pistons.

The suspension system 8 further comprises a damper 82 in the form of a dashpot that connects the platform block 6 and the seat element 2.

To be more specific, the springs 81 and the damper 82 of the suspension system 8 connect to the seat element 2 at a first guide block 10.

The first guide block 10 is provided with a first sleeve for engaging with the first pole 41 and a second sleeve for engaging with the second pole 42. The interface between the sleeves and the poles is such that the first guide block 10 is permitted to slide lengthwise, that is to say axially, along the poles but is generally prevented from other forms of movement relative to the support 4.

Figure 14:
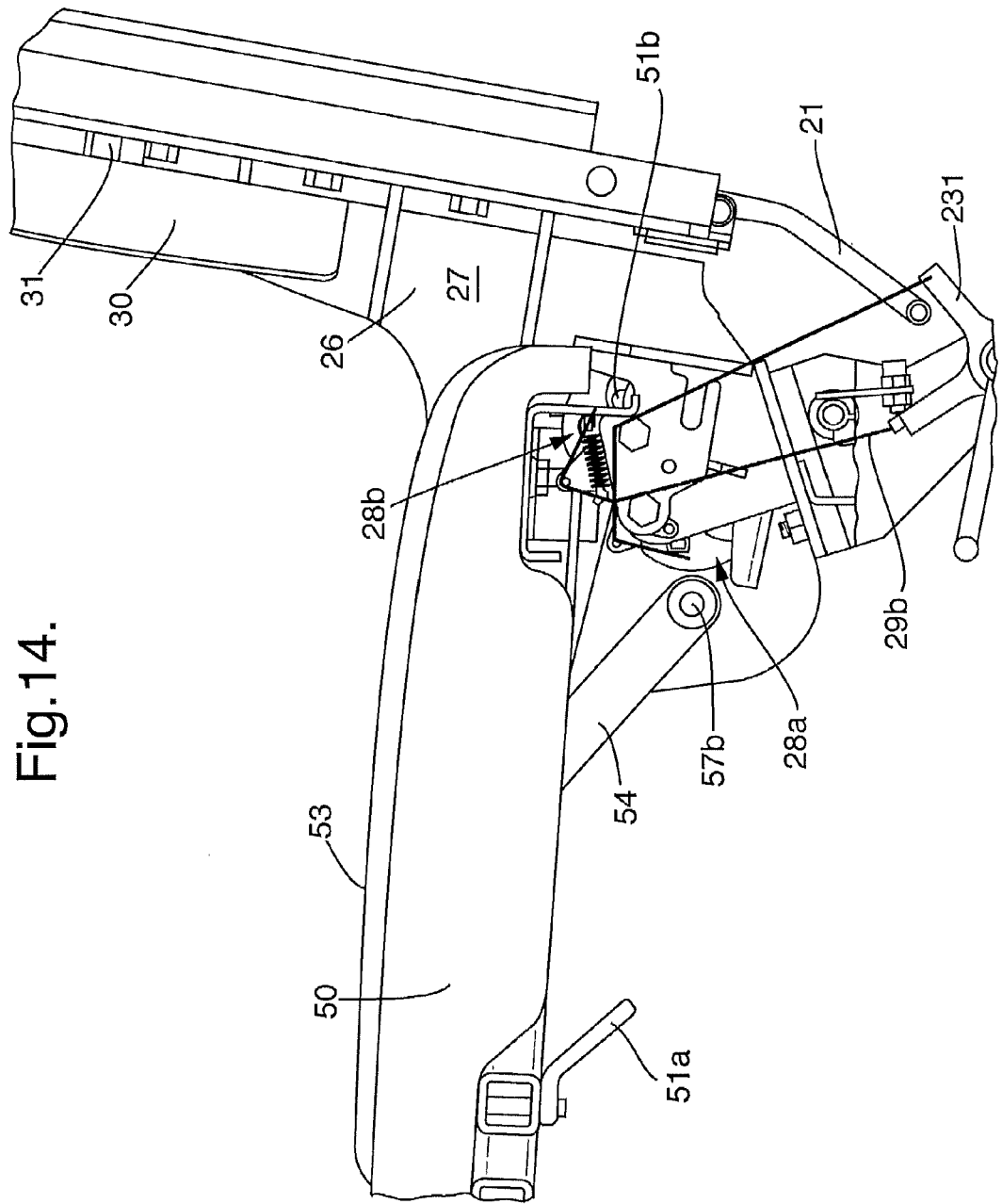
FIGS. 14 and 15 show cross sections through x-x of the seat as configured for seating and in a collapsed condition respectively.

At the seat element 2, the first guide block 10 is, in turn, connected to a seat chassis 20 that comprises a back frame 22, rails 24, a tray 26, a first latching gate 28a and a second latching gate 28b (FIG. 14).

The back frame 22 lies in a generally plate-like volume. The majority of the back frame 22 extends downwards from the connection to the first guide block 10 and a minority extends upwards. The back frame 22 is generally vertical and is arranged such that the plane it tends to define is substantially parallel with the plane that the pair of poles 41, 42 tend to define.

As can be appreciated from FIG. 6, the first guide block 10 does not connect at the lateral midpoint of the back frame 22 but is instead offset laterally. This provision can allow for the seat 1 to be set back further into the corner of a semicircular boundary (as might be defined where a pair of seats are provided in a turret).

The rails 24 are attached to the back frame 22 and mount the tray 26 at the back frame 22 such that the tray 26 can slide along the rails 24. The tray 26 and rails 24 are provided with a ratchet system 21 that permits the tray 26 to slide relative to the back frame 22 when the ratchet system 21 is actuated but secures the tray 26 at discrete points when the system is idle. A second weight-opposing resilient member 25 connects the tray 26 to a lower region of the back frame 22. The second weight-opposing resilient member 25 has the form of a pressurized cylinder and is biased to urge the tray 26 upwards along the rails 24 when the tray 26 is not secured by the ratchet system.

The tray 26 need not have a plate-like form. Indeed, and as shown in the figures, the tray 26 may include the form of a pair of runners, which do not connect directly to each other, and each of which engage with a respective rail 24.

The tray 26 is further provided with a pair of side panels 27. Each side panel 27 extends generally downwards and forwards from a lateral and lower extremity of the tray 26.

The side panels 27 are connected to a base member 50, which may alternatively be referred to as a seat pan. The base member 50 can lie flat in a generally horizontal plane, as such protruding forwards and providing a surface 53 onto which the occupant may sit directly down onto. In use, the weight of the occupant will therefore tend to pass through the base member 50 when the base member 50 is in a first condition.

Further connected to the back frame 22 are a set of beams 31 onto which beams 31 is mounted a back member 30. The beams 31 extend from a region of the back frame 22 that is between the rails 24 and protrudes forwards beyond the tray 26 to give a clearance between the back member 30 and the back frame 22 that is sufficient for the tray 26 to slide along the rails 24.

The back member 30 has the form of a panel and is provided with a cushioned aspect facing forwards so as to be able to accommodate an occupant's back and shoulders.

A headrest 46 for supporting the back of the occupant's head (and so as to mitigate the likelihood of injuries such as whiplash) extends from the support 4.

The base member 50 is connected to the side panels 27 of the tray 26 by an attachment 52. The attachment 52 is omitted from some of the schematic figures in the interests of simplifying these figures.

Figure 10:
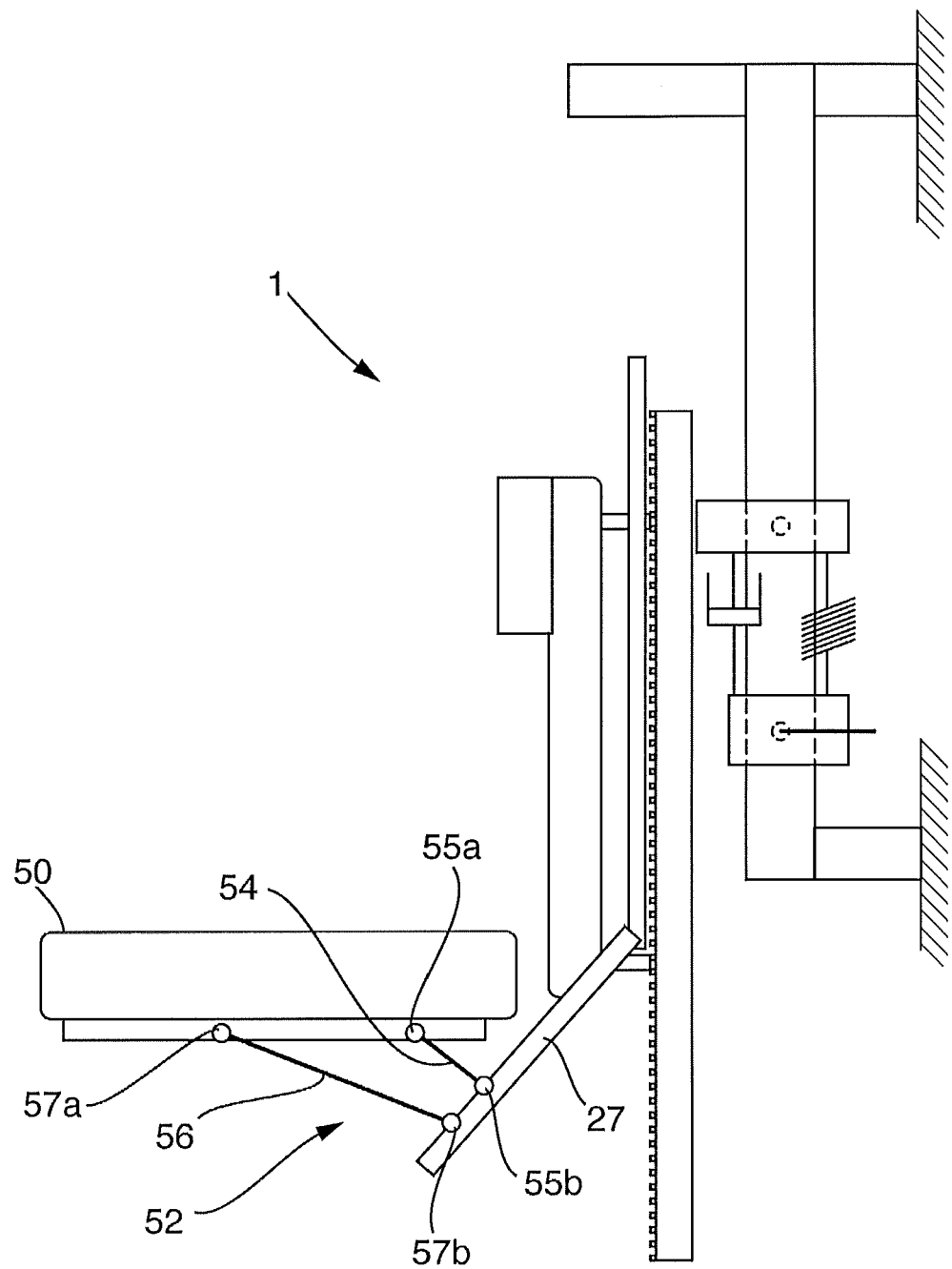
FIG. 10 shows a schematic representation of the seat with a particular representation of a seat collapse mechanism, viewed from a side aspect.

However as can be seen from, for example FIG. 10, the attachment 52 comprises a first link 54 extending between a first point at the side of the base member 50 and a first point on the side panel 27. The first link 54 is coupled to the base member 50 at the first point by a pivot joint 55a and is coupled to the side panel 27 by a pivot joint 55b.

A second link 56 in the attachment 52 extends between a second point at the side of the base member 50 and a second point on the side panel 27. Pivot joints 57a and 57b couple the second link 56 to the base member 50 and the side panel 27 respectively.

The pivot joint 57a is positioned forward of the pivot joint 55a when the base member 50 is in use and generally horizontal i.e. when the base member 50 is in a first condition. In such a condition, the pivot joint 57b is positioned on the side panel 27 forwards and downwards of the pivot joint 55b.

The configuration of the base member 50, the first link 54, the second link 56 and the side panel 27 provides a four bar linkage for reorienting the base member 50 relative to the side panel 27, and hence relative to the seat chassis 20.

Figure 11:
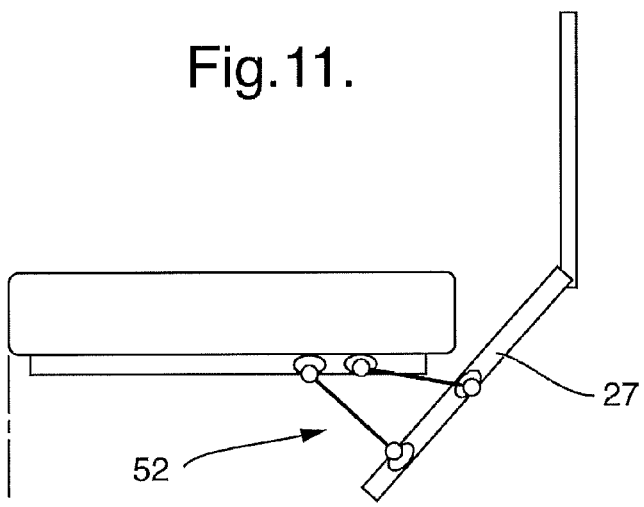
FIGS. 11, 12 and 13 show schematically how the seat as depicted in FIG. 10 may be configured into a collapsed condition.
Figure 12:
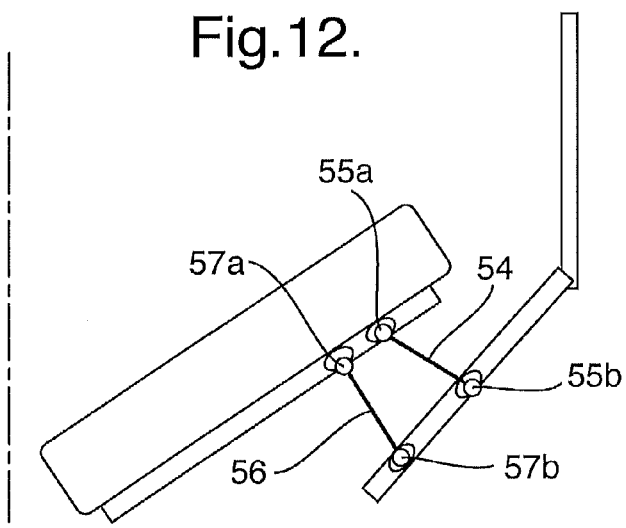
Figure 13:
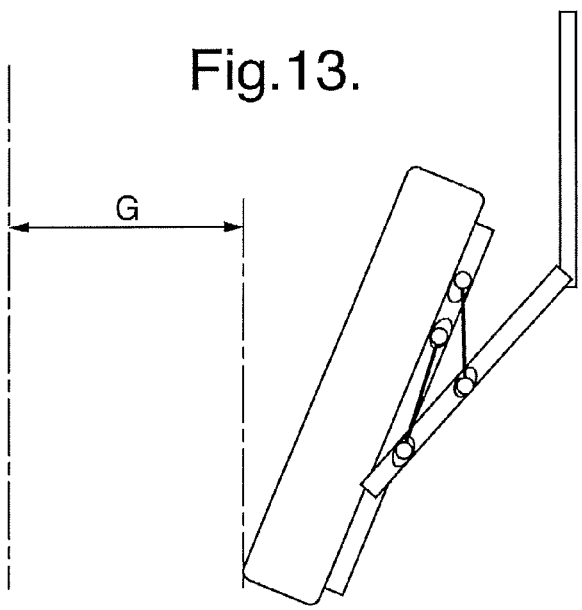
Figure 15:
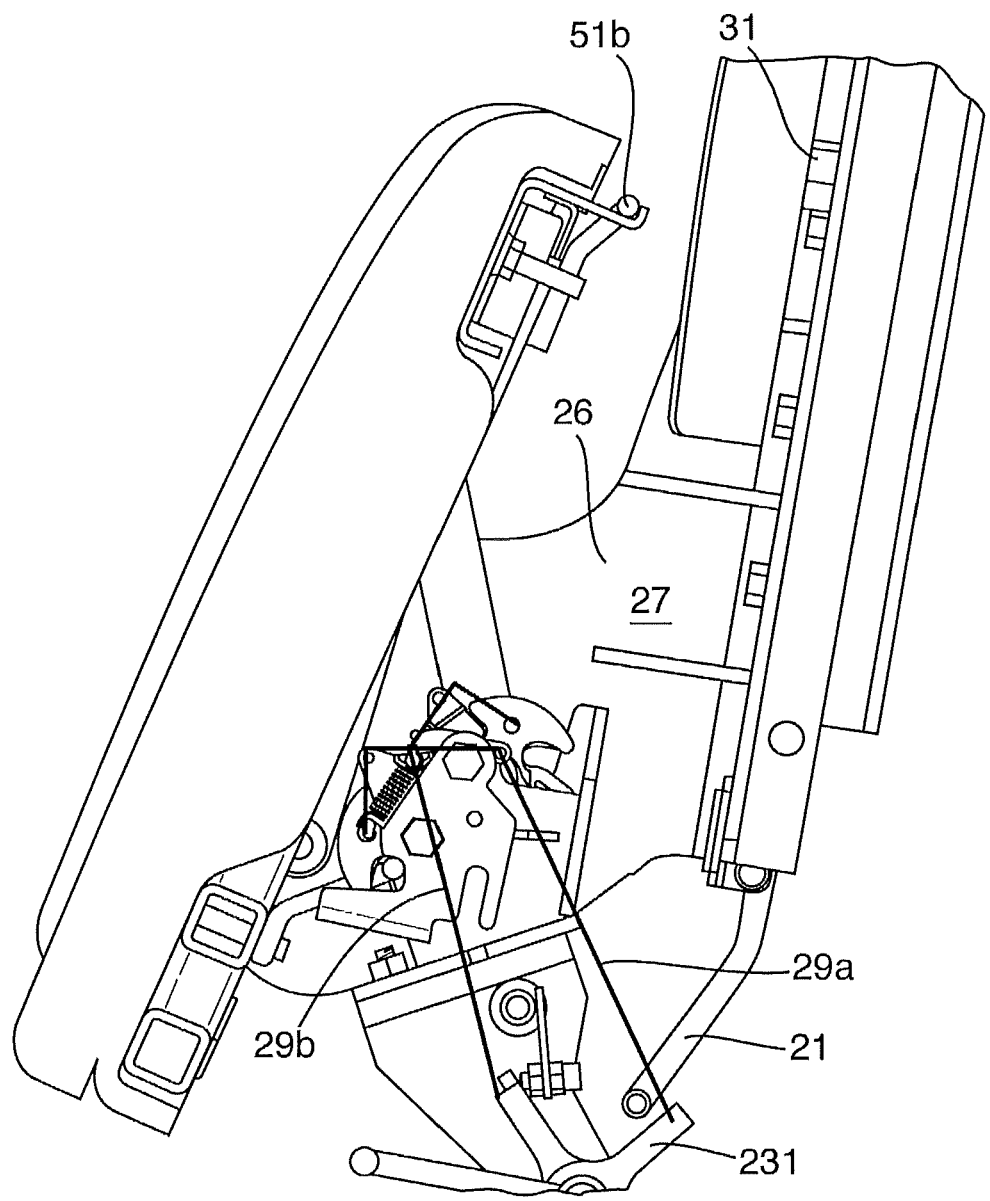

Specifically, the four bar linkage effects the transition of the base member 50 between two conditions. In the first condition, alternatively referred to as a 'sit-on' condition, and as shown in for example FIGS. 11 and 14, the base member 50 is generally horizontal and perpendicular to the back member 30 with a front end 58a protruding furthest forward and a back end 58b disposed closest to the back member 30. In the second condition, alternatively referred to as a 'slide-down' condition, and as shown for example in FIGS. 13 and 15, the base member 50 approximates to being generally parallel with the back member 30 and with the front end 58a tipped below the back end 58b. In the second condition, relative to the first condition, the back end 58b is raised.

A second four bar linkage which is equivalent to the first and which is hidden from view in FIG. 10, is provided on the opposite side of the seat 1 and connects the opposite lateral edge of the base member 50 to the opposite side panel 27.

Figure 16:
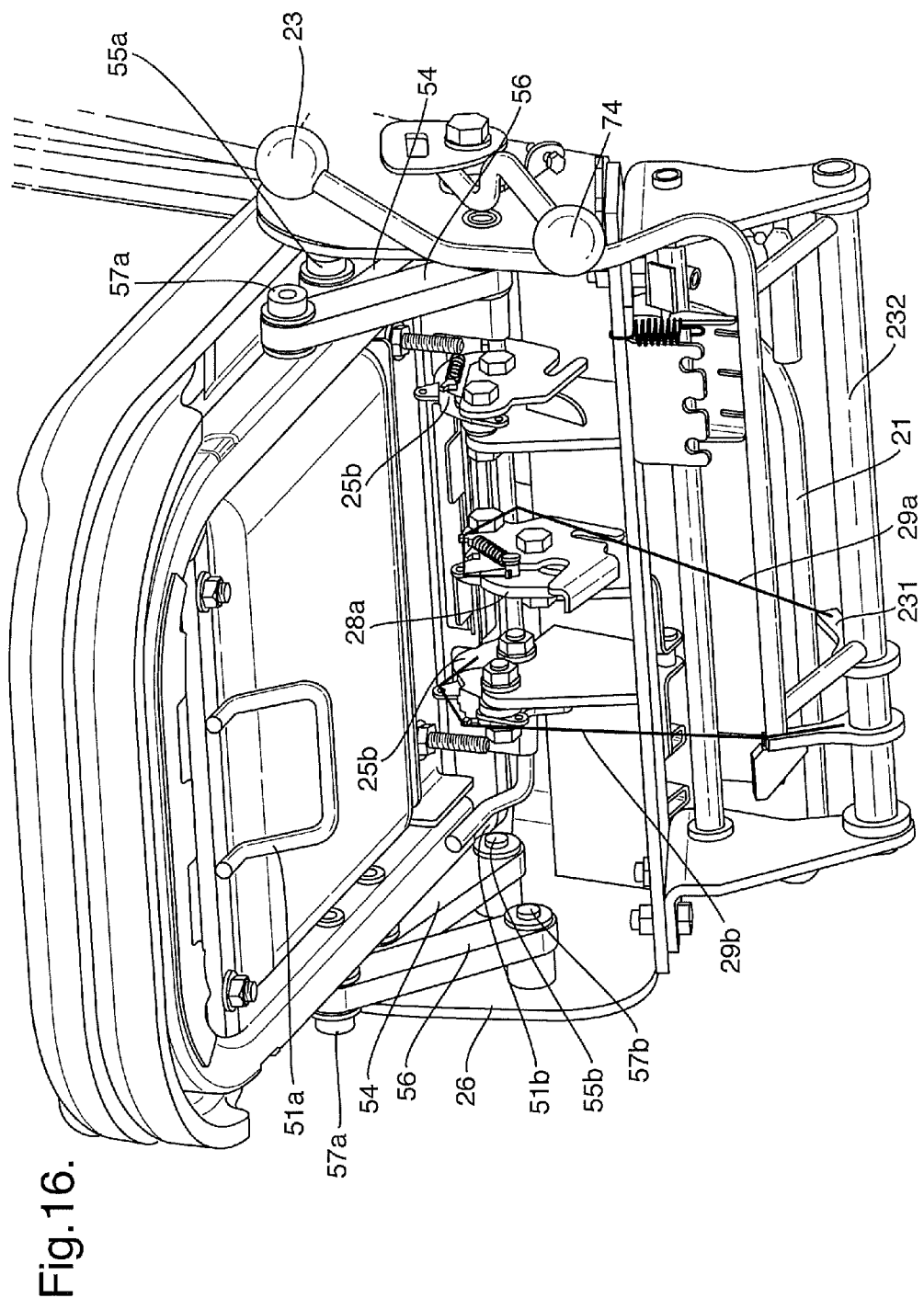
FIG. 16 shows a three dimensional representation of the seat, viewed substantially from an aspect underneath the seat.

At the underside of the base member 50 there is provided a first latching bar 51a and a second latching bar 51b. The latching bars 51a and 51b are clearly visible in FIGS. 14, 15 and 16.

The first latching bar 51a is located towards the front of the underside of the base member 50 and may connect to a first latching gate 28a when the base member 50 is in the second condition.

The second latching bar 51b is located towards the back of the underside of the base member 50 and may connect to a second latching gate 28b when the base member is in the first condition.

The first and second latching gates 28a, 28b are mounted at the seat chassis, at a portion of the tray 26 that extends down behind the base member 50 to approximately the same height as the side panel pivots 55b and 57b of the four bar linkage. The gates 28a and 28b are at generally the same height but are spaced apart laterally along the tray 26.

Each latching gate 28b, 28b has a form equivalent to an automotive door latch. As such each latching gate comprises, firstly, a resiliently pivoted crescent member that has a camming surface along its convex and external-facing side, and, secondly, a static member that cooperates with the concave side of the crescent member to define a trap when the crescent member is in its equilibrium position. A bar or pin may become trapped within the latching gate by being pushed against the camming surface of the crescent member, which pushing lifts the crescent member to permit entry to the trap. Once in the trap, the crescent member closes to secure the pin.

An actuator, such as a Bowden cable may be attached to the crescent member so as to enable selective application of a force that tends to open the trap and thereby allow the pin or bar to escape.

Accordingly, a first and second cable 29a and 29b, such as a Bowden cable, is associated with the first and second latching gates 28a and 28b respectively, each cable 29a and 29b extending between the latching gate and a lever 23 that is mounted at a location on the seat 1 that is convenient for the occupant to access.

The seat 1 further comprises a perch member 100.

The perch member 100 may be configured into a first 'as seat' condition (FIG. 22) or into a second 'as shoulder rest' condition (FIG. 21). The perch member 100 comprises an occupant accommodating face 110, a pivot joint 120, a fastening 130, a switch 140 and a second fastening 150.

The pivot joint 120 connects the perch member 100 to the back frame 22 of the seat chassis 2. In particular, the pivot joint 120 connects to the top edge of the perch member 100 so that in the absence of other factors, and with the seat disposed in an upright condition, the perch member 100 would tend to hang down from the pivot with the back of the perch resting on the back frame 22 and with the occupant accommodating face 110 generally flush with the equivalent face on the back member 30 (FIG. 21). In such embodiments, the entire surface 110 may be in contact with the shoulders of the occupant whilst in the second 'as shoulder rest' condition.

In certain alternative embodiments of the perch member 100, the pivot 120 may connect to the perch member 100 at a lower height such that in the first 'as seat' condition (FIG. 22), only a lower section of the occupant accommodating face can be in contact with the occupant. The seat should be adapted such that the portion of the perch member which is above the pivot can be accommodated in the 'as seat' condition.

The fastening 130 is provided to ensure that the perch member 100 may be secured whilst in the first condition. The fastening 130 comprises a linkage 132 and a latch mechanism 134. The linkage 132 is in the form of a two bar linkage and extends from a fastening pivot joint 131a at the bottom edge of the perch member 130 to a fastening pivot joint 131b at the back frame 22 and below the pivot joint 120.

A first link 138 of the linkage 132 extends from the fastening pivot joint 131b at the back frame 22 to an intermediate pivot 133. A second link 139 of the linkage 132 extends from the intermediate pivot 133 to the fastening pivot joint 131a at the perch member 100. A pin 135 extends laterally from a midpoint on the first link 138 of the linkage 132 and is configured to engage a latching gate 137 so as to lock the perch member 100 in place as it moves into the 'as seat' condition. The gate 137 is mounted at the seat chassis 2.

When the perch member 100 is in the first condition, the linkage 132 is fully extended with the effective angle (i.e. the angle subtended by a line drawn between the pivots 131a, 133 of the first link 138 and a line drawn between the pivots 133, 131b of the second link 139) between the first 138 and second 139 link being approximately 135°. As such the pivots of the linkage 132 are not collinear (i.e. their axes of rotation are not in the same plane) and so the linkage 132 can have a tendency to collapse.

When the perch member 100 is in the second condition, the linkage 132 is folded with the smaller effective angle between the first 138 and second 139 link being approximately 45°.

The gate 137 is also of a form equivalent to automotive door latches, having a resilient crescent member and a trap defining member. The gate 137 is provided with a cable (not shown), such as a Bowden cable, for remotely releasing the pin 135 from the gate 137 and hence the perch member 100 from its secured 'as seat' condition. The cable extends from the latch 137 to a switch 140 (shown in FIGS. 17 to 20) which is configured so as to be conveniently actuated by the foot of the occupant whilst sitting on the 'as seat' condition perch member 100.

The second fastening 150 is provided to ensure that the perch member 100 may be secured whilst in the second 'as shoulder rest' condition. The second fastening 150 has the form of a pivoted chock 152 that hangs about an axis generally coincident with the axis defined by the pivot joint 120. In the second condition, the form and the mass distribution of the chock 152 are such that the chock 152 hangs in a stable position and abuts the intermediate pivot 133 so as to prevent forward movement of the intermediate pivot 133 and thus prevents extension of the linkage 132.

The pivoted chock 152 is free to rotate about its pivot axis and may be rotated and lifted manually over the intermediate pivot 133 to allow the perch member 100 to deploy into the first 'as seat' condition.

In operation, the height of the base member 50, relative to the support 4 may be significantly altered. Such significant alteration is achieved by varying the set of recesses, either top 44 or bottom 45, into which the pins 61, 64 of the platform block 6 are deployed.

Figure 3:
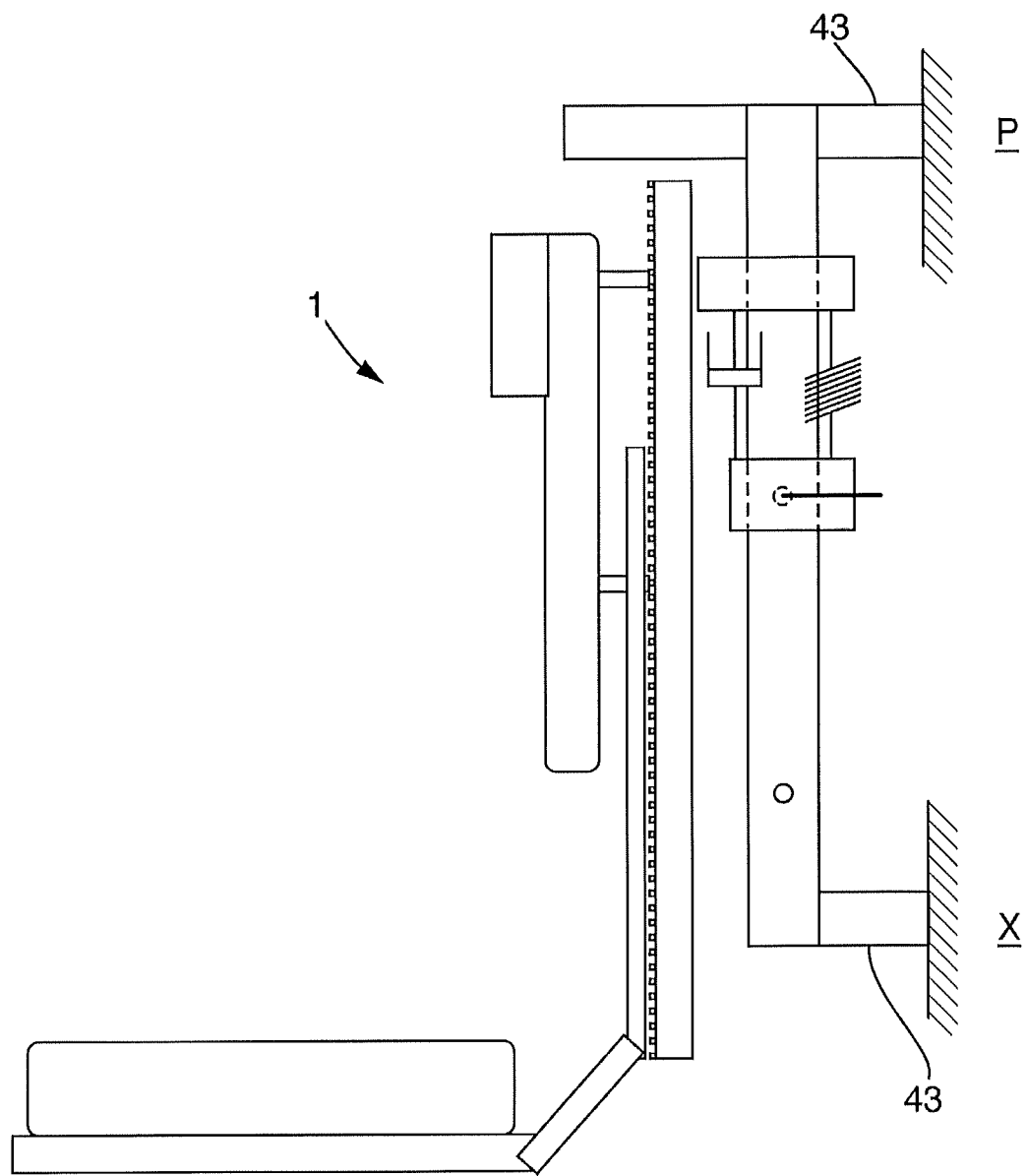
FIG. 3 shows schematically and from a side aspect the seat of FIG. 1 configured such that the occupant may occupy a high position.
Figure 4:
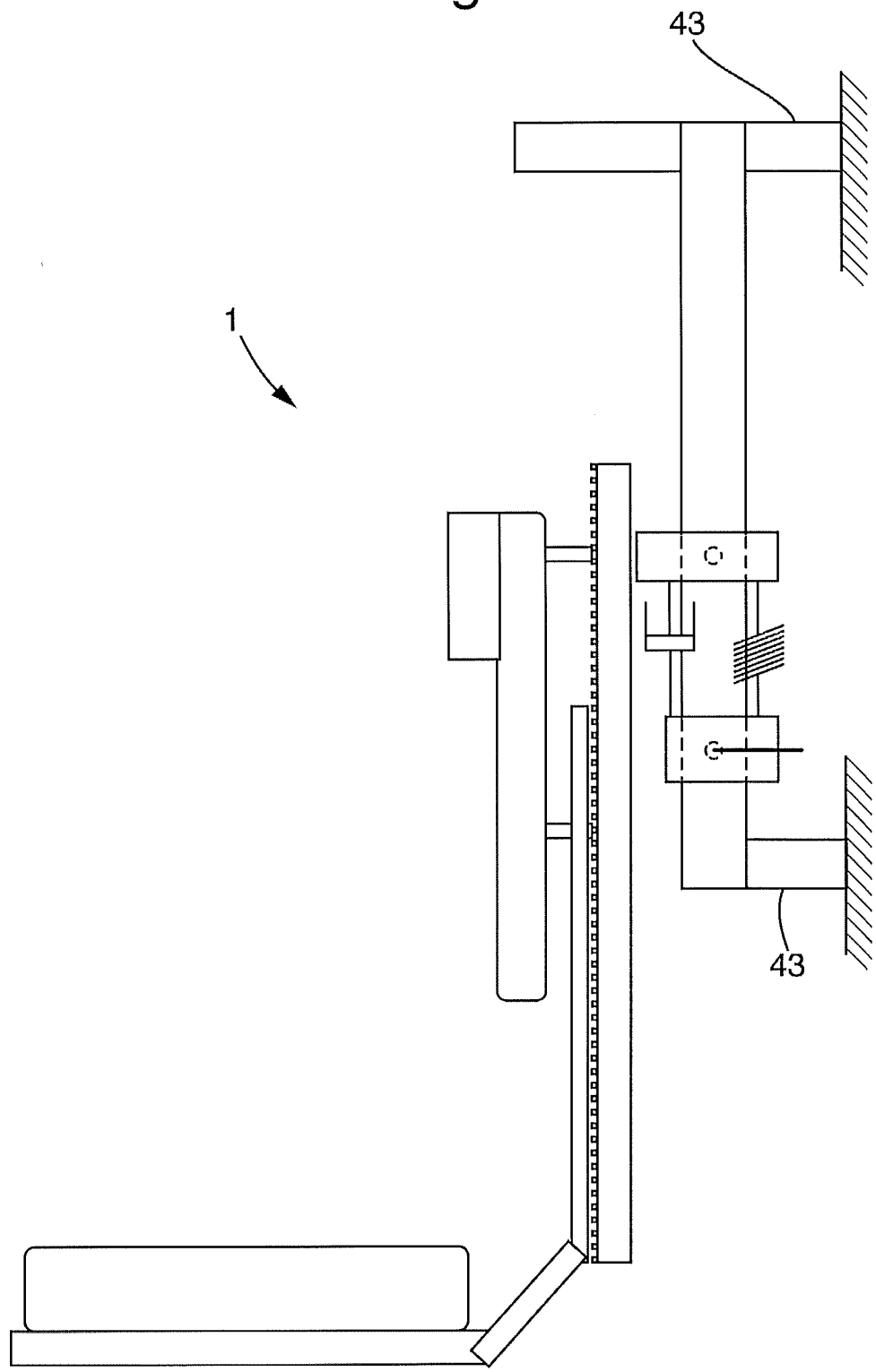
FIG. 4 shows schematically and from a side aspect the seat of FIG. 1 configured for a taller occupant to occupy a low position.
Figure 5:
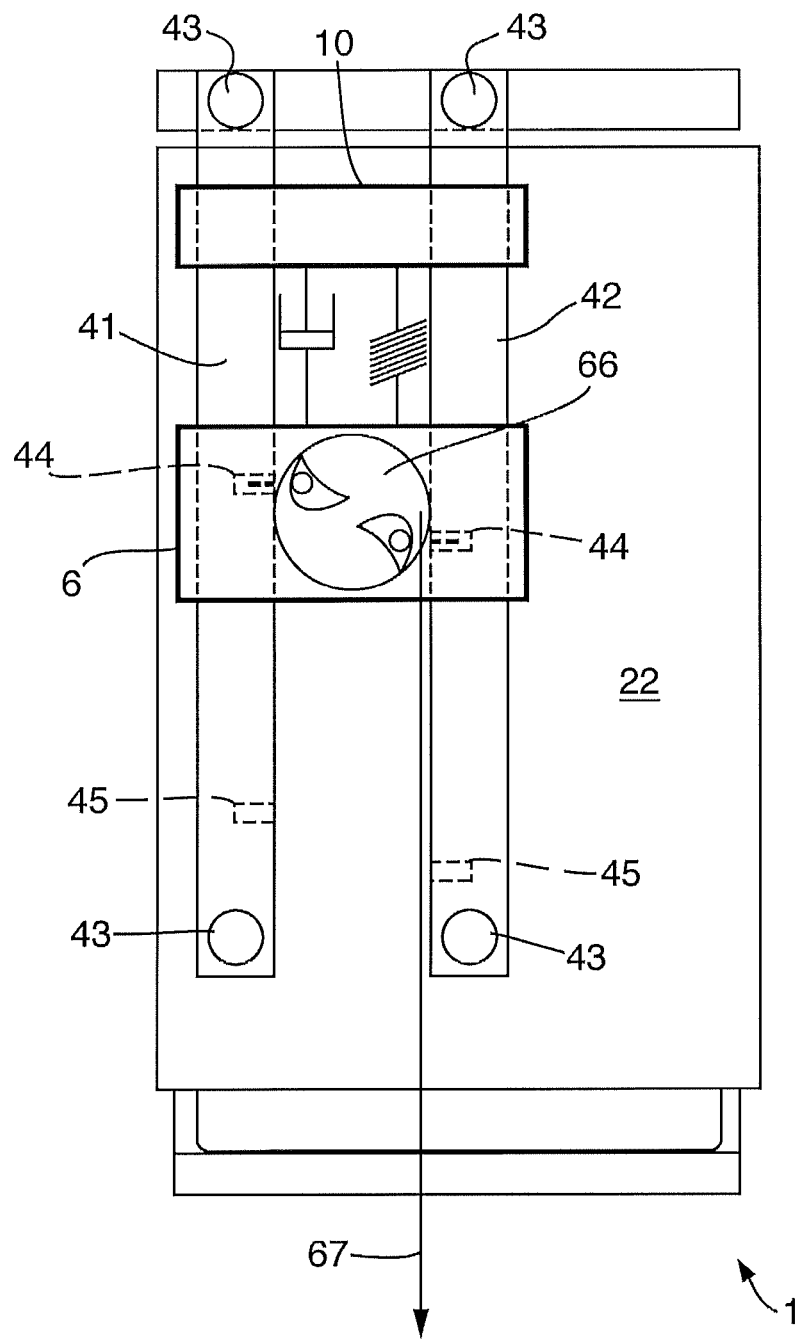

In particular, the height of the base member 50 may be altered from the low position as shown in FIG. 1 to the high position as shown in FIG. 3 as follows.

First the cable 67 is actuated by the occupant moving detent lever 74 so as to apply a force that may overcome the force exerted by the resilient pin-urging members 62 and 65 in the platform block 6. The application of such a force causes cam 66 to rotate clockwise.

Figure 9:
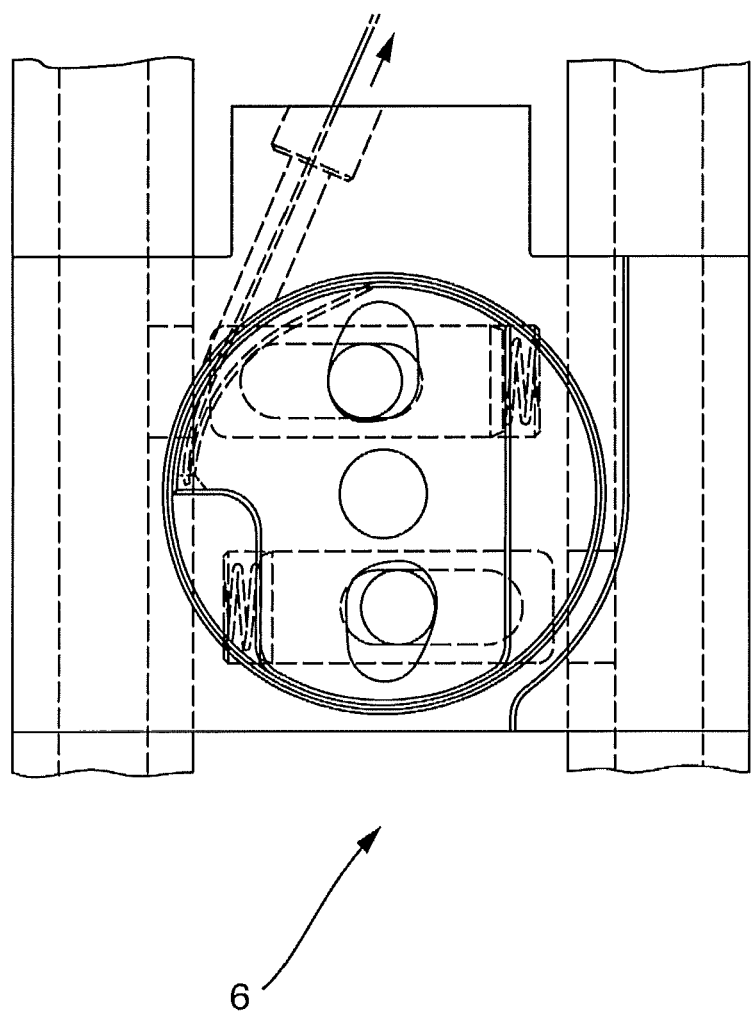

As shown in FIGS. 7, 8, and 9, as cam 66 rotates clockwise, the camming surfaces 63a and 63b act on the respective lugs 68, 69 of the pins 61 and 64 such that the pins 61 and 64 become withdrawn from the bottom recesses 45.

Once the pins 61 and 64 are withdrawn from their respective bottom recesses 45, the weight-opposing resilient member 47, which had previously been acting to urge the pins 61 and 64 into contact with the top walls of the bottom recesses 45, acts to urge the platform block 6 upwards along the poles 41 and 42. Thus a force for retracting the pins 61, 64 need be applied to the cable only for sufficient time to allow the weight-opposing resilient member 47 to propel the platform block 6 above the bottom recesses. After this time, the cable may be relaxed causing the pins 61, 64 to be urged back towards the poles 41, 42. However, with no recesses to accommodate the pins 61, 64, the platform block 6 will be permitted to slide over the poles.

As the weight-opposing resilient member 47 urges the platform block 6 upwards along the support 4, the whole seat element 2 and suspension system 8 is also raised. The weight-opposing resilient member 47 is configured to apply such a motive force until the platform block 6 arrives at the top recesses 44. The occupant will generally lift some or all of their weight off of the seat 1 during this process to permit the seat element 2 to move upwards.

Once the platform block 6 reaches the top recesses 44, the pins 61, 64 tend to be automatically deployed by their respective resilient pin-urging members 62, 65, thereby securing the platform block 6, and hence the seat 1, in the high position.

The seat 1 may return from the high position to the low position in a similar manner but with the difference that the occupant may remain seated and with their weight fully supported by the seat 1 over the course of the conversion. Indeed, the extra weight of the occupant, when combined with the weight of the seat components supported on the member 47, will tend to exceed the force applied by the member 47 and so the seat element 2 and its occupant will tend to fall down until the pins 61, 64 engage the bottom recesses 45.

In operation, the height at which the occupant sits may be finely adjusted by virtue of the ratcheted sliding that is permitted between the tray 26 and the back frame 22. A sliding upwards of the tray 26 is promoted by the weight-opposing resilient member 25 when the occupant removes some or all of their weight from the seat element 2 and the ratchet system is actuated. The ratchet system 21 is actuated when the occupant pulls tilt lever 23 backwards. This causes a cantilever member 231 on lever bar 232 to push on the lever bar of the ratchet mechanism 21, thus retracting a pawl (not shown) of the mechanism 21 so that the tray 26 becomes free to slide along the rails 24. Pulling the tilt lever 23 backwards also acts to open the first latching gate 28a but this has no particular effect as there is no bar trapped within this latching gate when the base member 50 is in the 'as seat' condition, which is the condition where the fine adjustments to the seat height will generally be made.

A sliding downwards is permitted by the weight-opposing resilient member 25 when the occupant sits on the seat element 2 and the ratchet system 21 is disengaged. The rails 24 guide the tray along the back frame 22 and provide a set of teeth which work in conjunction with a pawl (not shown) to secure the tray 26 at each position.

In operation, the perch member 100 may be secured in either the first condition or the second condition and may be converted from one condition to the other.

The perch member 100 is converted from the second condition to the first condition by manually moving the pivoted chock 152 so that it lifts above and out of contact with the intermediate joint 133 of the linkage 132. With the chock 152 thus held out of the way, the perch member 100 may be lifted up by rotating it about the pivot 133 so that bottom of the perch member 100 moves out of contact with the back frame 22 and continues until the perch member 100 is generally horizontal and in the first condition. Over the course of this conversion the linkage 132 extends so that the smaller effective angle between the links 138, 139 increases from approximately 45° to approximately 135°. Also, over the course of this conversion, the pin 135 extending laterally from the first link 138 engages and becomes trapped inside the latch 137. The trapped pin 135 secures the perch member 100 in the first condition by preventing rotation of the first link 138 about the back frame pivot 131b.

The perch member 100 is converted from the first condition to the second condition by releasing the pin 135 from the latch 137. The latch 137 releases the pin 135 by the application of a force to a cable (not shown), which may conveniently be done by the occupant kicking a switch 140 that is connected to the remote end of the cable (not shown).

Once the pin 135 is released from the latch 137, the first link 138 is free to rotate about the back frame pivot 131b and because the linkage pivots 131a, 131b and 133 are not collinear (i.e. their axes of rotation do not lie in the same plane) the linkage 132 tends to collapse. As such, the perch member 100 becomes free to pivot about the joint 120 back to the second position and tends to do so under the weight of the perch member 100 or under the combined weight of the perch member 100 and the occupant.

The arrangement of the perch member 100 and the seat 1 is such that as the perch member 100 rotates from the first condition orientation to the second condition orientation, any occupant sitting on the perch member 100 will drop down to the base member 50 but tend to have the impact of the fall onto the base member mitigated by the suspension system 8.

In operation the base member 50 may be converted from the first condition, or 'sit on' condition, to the second condition, or 'slide down' condition. Further the base member 50 may be converted back from the second condition to the first condition.

In order to convert the base member 50 from the first condition, the first latching bar 51a must be released from the first latching gate 28a. This may be done by pushing the tilt lever 23 forwards causing the lever bar to rotate and thereby pull on cable 29a so as to open the latch.

Upon release of the bar 51a, the base member 50 is free to move as the free link in a four bar linkage (that is to say that neither the base member 50 nor the pivots which connect to it are fixed to one particular location relative to the tray 26). In such a free state, the occupant may manually effect the conversion by pushing generally downwards on the front edge 58a of the base member 50. Such pushing tends to rotate the base member 50 about both the pivots 55a and 57a so as to raise the back end 58b of the base member 50 (with respect to the figures, this is an anticlockwise rotation of the base member 50). The rotation of the base member 50 and the associated raising at the back end 58b causes the first link to counter rotate (that is to say it rotates in the opposite direction to the base member 50, which is clockwise in the context of the figures). Such counter rotation tends to draw the pivots 55a and 55b higher and in towards the tray 26. Accordingly the base member 50, which is connected to the pivots 55a and 57a, is also drawn in towards the tray 26.

As the base member 50 arrives at the second condition, the first latching bar 51a engages with the first latching gate 28a and becomes trapped therein to secure the base member 50 in this condition. The surface 53 faces forwards.

The difference in forward protrusion, parameter G in the figures, is approximately 200 mm. 200 mm can relate to a significant amount of space in the turret of an armoured vehicle.

In order to convert the base member 50 from the raised condition to the as seat condition, the first latching bar 51a must first be released from the first latching gate 28a. Such release is done by pushing the tilt lever 23 backwards so that cable 29a is pulled to open the gate 28a.

Once released, the base member 50 may be pulled forwards and pushed downwards by the occupant. Such manoeuvring of the base member 50 rotates the base member 50 relative to the tray 26 (which rotation is clockwise in the context of the figures) whilst the links 138, 139 counter rotate (which counter rotation is anti-clockwise in the context of the figures). The counter rotation of the links 138, 139 tends to move the base member 50 forwards. Eventually, the rotation and translation of the base member 50 brings the second latching bar 51b into engagement with the second latching gate 28b.

When the seat 1 is disposed in certain confined volumes such as that denoted as V in FIGS. 17, 18, 19 and 20, the combined operation of the collapsible base member 50, the significantly alterable height of the seat element 2 and the fine height alteration ability of the tray 26, can provide an evacuation route from the confined volume V. In particular this evacuation route leads under the seat 1 and may be of particular benefit when it is not preferable to evacuate the confined volume V through a roof hatch (e.g. because the confined volume V is the turret of an armoured vehicle under hostile gunfire).

As shown in FIGS. 17, 18, 19 and 20, the combination of operations that provides this evacuation route, where initially the seat 1 is configured for seating the occupant within the confined area is as follows: i) the base member 50 is converted from the first condition to the second condition. Such a procedural step will inevitably result in the occupant no longer being seated on the seat 1 and the collapse of the base member 50 provides sufficient space forwards of the seat 1 to allow the seat element 2 to rise to the higher condition without obstruction from the non-sitting occupant. Accordingly, at step ii) the seat element 2 is converted to its higher position, see FIG. 19; and at step iii) the tray 26 is converted to its highest condition, see FIG. 20. A tunnel, provided behind the seat 1, is now accessible by the occupant.

The base member 50 is formed from a layer of high density energy absorbing foam interposed between a top layer of comfort foam (which provides the surface 53) and a bottom structural layer composed of a glass fibre spall liner.

The back member may be formed with a layer of comfort foam facing forwards and mounted on a backing layer made from glass fibre spall liner.

The major load-bearing structural components of the seat are composed from a material having appropriate properties. For example mild steel may be selected for the support, the platform block and the seat element. Where the seat is necessarily lightweight, aluminium, titanium or suitable alloys may be used in place of mild steel. Any combination of these materials may be used as appropriate.

The distance between the first and second position of the secured platform block may vary with the vehicle which the seat is intended for. Where the seat is intended for a turreted armoured vehicle, the first securable position of the platform block may be 200 mm to 500 mm below the second securable position.

The tray may travel between a lower height extremity and an upper height extremity, these extremities being approximately 200 mm apart so that a comprehensive anthropomorphic range of occupants may use the chair comfortably.

The weight opposing resilient members 47 and 25 can be in the form of gas struts.

The resilient member 81 may be in the form of a spring and should be calibrated according to suitable parameters. In particular, variable parameters such as the mass of the vehicle, the impulse from a blast, the pre-explosion loading of the member and the space available within the vehicle should be considered in calibrating the spring alongside parameters such as the limit of survivable human acceleration and the worst case scenario weight of an occupant.

Where the vehicle is estimated as having approximately a 30,000 kg mass and the impulse from the expected blast is approximately 100,000 Ns and the spring is pre-loaded to 3 g, the applicant has calculated that the spring should have a stroke of approximately 90 mm, should be preloaded to apply a force of approximately 4,000N and should apply a maximum force of approximately 13,000N.

As an alternative to the cables disclosed above as means for applying actuating forces at positions remote from the actuated components, the skilled man would understand that other forms of actuation would be possible. For example hydraulic actuation systems could be configured for releasing any of the pins and latching bars discussed above from their respective latching mechanisms.

As an alternative to the above configuration of the seat element to support interface where one guide block is provided, the seat element may be provided with a plurality of guide blocks. In connection with this alternative, the support poles may extend downwards to a greater extent and thereby allow space for the provision of a second guide block arranged to travel along the poles and below the platform block. The first and further guide block may each be fixed to the back frame and may be connected to each other.

As an alternative to the above configuration of the support poles, seat element and platform block (where the platform block is interposed between the poles and the pins deploy outwardly), the seat may be provided with a central support member that is surrounded by the platform block with the platform block being configured to promote deployment of the pins inwardly towards the single support member.

A specific example of the invention and various alternatives have been described, but a skilled man would upon reading the present description be enabled to generate further alternative embodiments of the invention without recourse to inventive activity and without departing from the scope of the invention.

The invention claimed is:

1. A seat system for a vehicle, the seat comprising:
a substantially vertical support constructed and arranged for attachment to a wall of the vehicle;
seat components comprising:
a back member for supporting an occupant's back when in use,
a base member, comprising a front edge and a back edge, the base member being for configuration in a first condition where the base member extends generally perpendicularly from the back member and is suitable for accommodating an occupant in a sitting position, and being for configuration in a second condition where the base member is retracted and thereby tends to reduce a profile of the seat, and
a side member;
a seat element including a seat chassis for supporting the seat components; and
an attachment comprising:
a first link extending from a first pivot joint on the side member of the seat chassis to a first pivot joint on the base member, and
a second link extending from a second pivot joint on the same side member of the seat chassis as the first link to a second pivot joint on the base member, wherein the first and second links, the base member and the seat chassis thereby provide a four bar linkage,
the first and second links of the four bar linkage being configured to connect the base member to the seat chassis such that the base member may be selectively configured between the first condition and the second condition, wherein selectively configuring from the first condition to the second condition will cause the base member to rise at the back edge with respect to a point on the at least one side member, and dip at the front edge of the base member with respect to the point on the at least one side member,
wherein said seat element is slidably mounted in a substantially vertical direction along said substantially vertical support.

2. A seat system according to claim 1, wherein a duplicate first link and a duplicate second link are provided on an opposite side of the seat chassis to the first link and the second link.

3. A seat system according to claim 1, wherein the side member includes at least one structural side member that extends frontwards.

4. A seat system according to claim 1, wherein the side member includes a side panel.

5. A seat system according to claim 4, wherein the side panel extends forwards of the back member to a distance that is in a range of 100 mm to 400 mm.

6. A seat system according to claim 1,
wherein the seat comprises a first latching bar and a second latching bar, and
wherein the seat chassis comprises a first latch gate and a second latch gate, the first and second latching bars and the first and second latch gates being operable such that:
 as the base member is configured into the first condition, the first latching bar engages with the first latch gate to secure the first latching bar; and
 as the base member is configured into the second condition, the second latching bar engages with the second latch gate to secure the second latching bar.

7. A seat system according to claim 6, wherein the second latching bar is disposed towards the back edge of the base member.

8. A seat system according to claim 6, wherein each of the first latch gate and the second latch gate is provided with a release actuator which, when operated, allows a release of any latching bar secured in that latch gate.

9. A seat system according to claim 1, wherein the seat chassis comprises a structural side member that extends frontwards.

10. A seat system according to claim 1, wherein the side member is a side panel.

11. A seat system according to claim 10, wherein the side panel extends forwards of the back member to a distance that is in range of 100 mm to 400 mm.

12. A seat system according to claim 9,
wherein the seat comprises a first latching bar and a second latching bar, and
wherein the seat chassis comprises a first latch gate and a second latch gate, the first and second latching bars and the first and second latch gates being operable such that:
 as the base member is configured into the first condition, the first latching bar engages with the first latch gate to secure the first latching bar; and
 as the base member is configured into the second condition, the second latching bar engages with the second latch gate to secure the second latching bar.

13. A seat system according to claim 12, wherein each of the first latch gate and the second latch gate is provided with a release actuator which, when operated, allows a release of any latching bar secured in that latch gate.

14. A seat system according to claim 1, wherein the seat element comprises a first guide block that is connected to the seat chassis.

15. A seat system according to claim 14, wherein said substantially vertical support comprises a platform block, said platform block provided with a first sleeve for engaging with the first pole and a second sleeve for engaging with a second pole, such that the platform block is permitted to slide axially along the first and second poles.

16. A seat system according to claim 1, wherein said seat chassis comprises a back frame, rails, and a tray that is slidable along the rails.

17. A seat system according to claim 16, wherein said tray and rails are provided with a ratchet system that permits the tray to slide relative to the back frame when the ratchet system is actuated and that secures the tray at discrete points when the ratchet system is idle.

\* \* \* \* \*